July 22, 1969   H. N. BAYLOR   3,457,291
PRODUCTION OF ISOCYANATES
Filed April 1, 1965
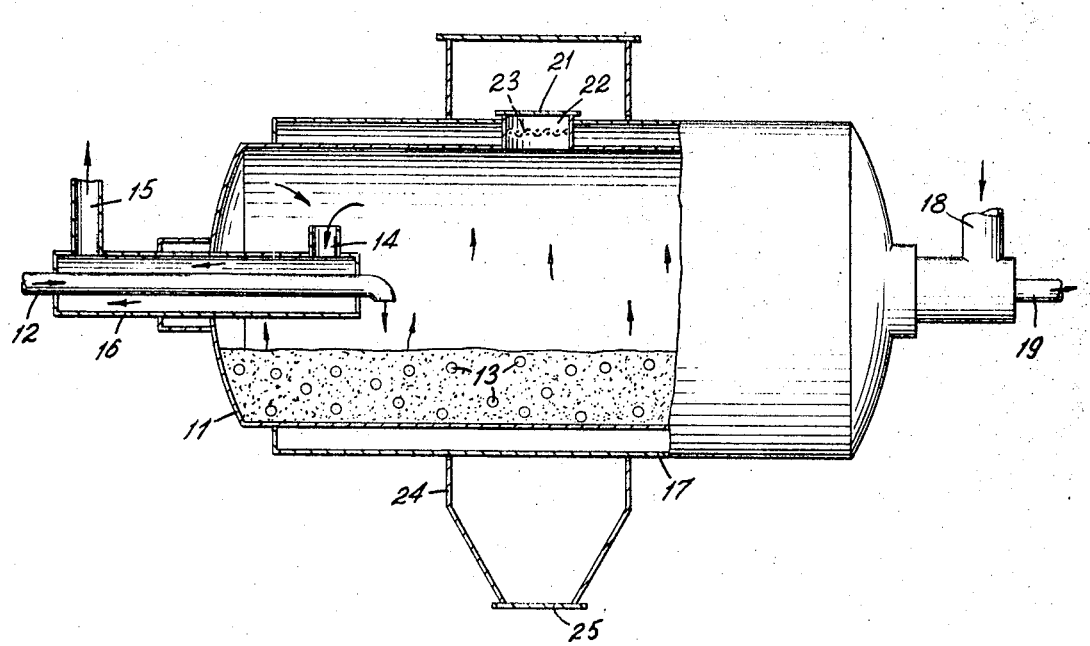
INVENTOR
HARRY N. BAYLOR
BY Charles J. Metz
ATTORNEY

United States Patent Office 3,457,291
Patented July 22, 1969

3,457,291
PRODUCTION OF ISOCYANATES
Harry N. Baylor, Charleston, W. Va., assignor to Union
Carbide Corporation, a corporation of New York
Filed Apr. 1, 1965, Ser. No. 444,721
Int. Cl. C07c *119/04*
U.S. Cl. 260—453                                     2 Claims

ABSTRACT OF THE DISCLOSURE

A process for producing isocyanates that comprises evaporating distillation residues containing volatile organic isocyanates and non-volatile polymeric products in a rotating mill-type evaporator. The organic isocyanates thereby produced are useful in the preparation of polyurethane plastics.

---

The invention relates to an improvement in a process for the production of volatile isocyanates. More particularly, the invention relates to a process for recovering isocyanates from a reaction mass that contains a mixture of isocyanate and polymeric products.

Isocyanates are produced commercially by reacting an amine with phosgene. The phosgenation step, which produces the isocyanate product, also produces as a byproduct a high boiling polymeric residue. Among the compositions that are found in the polymeric residue are ureas, polyureas, biurets, isocyanurates, and other materials. The isocyanate product is recovered from the phosgenation reaction mass by distillation. In the distillation, the isocyanate product is separated from the polymeric residue. The polymeric residue concentrates in the distillation apparatus and bcomes more viscous with continued exposure to elevated temperature. In order to prevent the polymeric residue from fouling the distillation apparatus, it is necessary that it be diluted with some of the desired isocyanate product in order to keep it in a fluid state. For this reason, the distillation residue contains a significant proportion of the isocyanate product. It would thus amount to a substantial economic loss if this distillation residue were discarded.

The present invention is based upon the discovery that a mill-type evaporator can be employed to separate isocyanate from polymeric residue and that, surprisingly and unexpectedly, a significant proportion of the polymeric residue breaks down in the mill-type evaporator to produce additional isocyanate. The process of the invention comprises feeding distillation residue from a phosgenation process into a mill-type evaporator such as a heated ball mill, separating volatile isocyanate from polymeric residue, and recovering the volatile isocyanate produced thereby.

The distillation residue that is employed in the invention is produced as a by-product of a phosgenation process. Methods whereby amines are reacted with phosgene to form the corresponding isocyanates are well known in the art. For instance, various phosgenation processes are disclosed in U.S. Patents Nos. 2,680,127; 3,128,310 and 3,155,699 and in French Patent No. 1,368,031, as well as in many other publications. The various phosgenation processes have on feature in common, that is, the recovery of the isocyanate product from the phosgenation reaction mixture is effected by distillation. The phosgenation reaction produces as a by-product a residue of high-boiling polymeric material that is concentrated in the distillation apparatus and which must be removed from the distillation apparatus as a mixture containing a significant amount of the desired isocyanate product. The proportion of isocyanate in the distillation residue mixture varies over a wide range. It can be as much as about 95 weight percent of the distillation residue although from about 15 to about 65 weight percent is more usual. The distillation residue normally contains from about 15 to about 50 weight percent of the total isocyanate produced by the phosgenation reaction.

The mill-type evaporator that is employed in the invention can be a conventional ball mill having driving means, heating means, means for introducing the phosgenation residue, means for recovering the isocyanate product, means for periodic removal of solids from the mill, and the like.

The mill-type evaporator can be a heated rotating chamber that is constructed of steel or other material that is substantially unreactive towards isocyanate. The mill can be of any geometrical configuration. The mill can be charged with balls, rods, irregularly shaped objects, or the like, which can be constructed of steel, stone, or the like. Heating means on the mill is preferably provided by a steam jacket, although other means such as an oil bath can be used if desired. The distillation residue is fed into the revolving mill preferably continuously, although a batch process can be used if desired. The isocyanate is vaporized in the mill and is recovered from the mill in the vapor state. Recovery of the isocyanate vapor from the mill is facilitated by maintaining a vacuum in the mill. For example, it is preferred to maintain an absolute pressure of from about 1, or less, to about 700, or more, millimeters of mercury in the mill. Periodically, it is necessary to remove solids from the mill. This can be done by conventional means.

The mill is maintained at an elevated temperature during the process of evaporation. For instance, the mill is normally maintained at a temperature in excess of 100° C., preferably in excess of 200° C., and more preferably in excess of 250° C. up to about 350° C. or more. One preferred temperature range is from about 150° C. to about 250° C. The process of the invention is continued for a period of time sufficient to recover isocyanate from the phosgenation process distillation residue. Numerical limits cannot be set for the evaporation process time because the process can be run on a continuous basis (with occasional shutdown periods for removal of solids from the mill) with continuous recovery of isocyanate product.

The understanding of the invention is facilitated by referring to the accompanying drawing.

The drawing is a schematic view of a typical ball mill that is equipped for use in the process of the invention.

The ball mill can be operated in the manner discussed below. The distillation residue from the phosgenation process is fed into the rotating ball mill 11 through feed duct 12. The resdue is mixed with the balls 13 and as soon as the isocyanate is heated it vaporizes. The isocyanate vapor passes into recovery duct 14 and from there out of duct 15 into a collector. The isocyanate vapors pass from duct 14 to duct 15 through jacket 16 which can surround feed duct 12 and thereby heat the distillation residue as it enters the system. The ball mill 11 is heated by a steam jacket 17. The steam enters the jacket 17 through duct 18 and the condensate passes out of the system through duct 19. A vacuum can be maintained within the ball mill 11 through duct 15. When it becomes necessary to remove solids from the interior of the ball mill 11, ducts 12 and 15 are closed, the steam can be turned off, and the rotation stopped. Cover 21 is removed and a screen 23 is inserted in opening 22. The mill is then rotated so that opening 22 faces down. The screen 23 keeps the balls 13 from falling out of the mill 11, while the solid material is discharged through the opening 22 into the solids discharge hood 24 and then out the bottom 25. The process is started up again by removing screen 23 and replacing the cover 21, turning on the steam, and opening ducts 12 and 15.

The mill-type evaporator herein described offers advantages over all other known devices used because: (1) it removes essentially all the isocyanate from the polymeric residues, (2) it thermally cracks a significant portion of the polymeric residues to produce additional isocyanate, (3) the heat transfer surface is not fouled by the polymeric residues, and (4) evaporation of product is facilitated by the size reduction of the residue which thus presents a large surface area for heat transfer. Specific devices, such as the wiped-film still described in U.S. Patent 3,140,305, necessarily leave substantial amounts of isocyanate in the polymeric residue. Devices such as those described in U.S. Patent 2,706,169 concerning a tank-type evaporator with an anchor stirrer have the disadavantage of having a heat transfer surface that is prone to fouling. An object of the present invention is to provide a device that exerts a mechanical force on the heated transfer surface that is capable of fracturing solid residues. The mill-type evaporator also offers the greatest heat transfer area to volume ratio of all known types of equipment used in this service. The solid residue that is produced by the process of the invention is an easily flowable, non-tacky, dry powder. The residues from other known processes for separating isocyanate from distillation residues are tacky, sticky materials that are not easy to handle.

The invention is useful for producing monoisocyanates and polyisocyanates. Among the monoisocyanates and polyisocyanates contemplated are aromatic, aliphatic, and alicyclic mono-, di-, tri-, and tetraisocyanates. Specific illustrative isocyanates include aliphatic monoisocyanates such as methyl isocyanate, ethyl isocyanate, propyl isocyanates, buty isocyanates, hexyl isocyanates, 2-ethylhexyl isocyanate and other octyl isocyanates, decyl isocyanates, and the like. Illustrative aliphatic polyisocyanates include hexamethylene diisocyanate, bis(2 - isocyanatoethyl) fumarate, bis(2-isocyanatoethyl) carbonate, bis(2-isocyanatopropyl) carbonate, bis(2-isocyanatoethyl) 5-norbornene-2,3-dicarboxylate, bis(2-isocyanatoethyl) 1,4,5,6,7,7-hexachloro-5-norbornene-2,3 - dicarboxylate, bis(2 - isocyanatoethyl) 4-cyclohexene-1,2-dicarboxylate, bis(2-isocyanatoethyl) cyclohexene-1,2-dicarboxylate, bis(2 - isocyanatoethyl) ether, and the like. Illustrative cycloaliphatic isocyanates includes cyclohexyl isocyanate, cyclohexylene diisocyanates, bis(4 - isocyanatocyclohexyl)methane, methylcyclohexylene diisocyanates, di(isocyanatomethyl)-cyclohexane, and the like. Illustrative examples of aromatic monoisocyanates are phenyl isocyanate, tolyl isocyanate, xylyl isocyanate, and the like. Spicific illustrative aromatic polyisocyanates includes 2,4- and 2,6-tolylene diisocyanate, phenylene diisocyanate, bitolylene diisocyanate, naphthalene diisocyanate, 1-methoxy-2,4-diisocyanatobenzene, 1-methyl-4-methoxy-2,5-diisocyanatobenzene, 1-propoxy-2,4 - diisocyanatobenzene, bis(4 - isocyanatophenyl)-methane, and the like. Other useful volatile organic isocyanates includes xylylene diisocyanate, 1-methyl-2,4,6-triisocyanatobenzene, 2,4,4' - triisocyanatobiphenyl, and the like. In general, the process of the invention is useful for the production of any volatile organic isocyanate. By "volatile" is meant any organic isocyanate that boils below about 325° C. at 10 millimeters of mercury pressure, preferably an isocyanate that boils below about 300° C. at 20 millimeters of mercury pressure, and more preferably an isocyanate that boils below 275° C. at 100 millimeters of mercury pressure. The preferred isocyanates include the aromatic and aliphatic diisocyanates. Tolylene diisocyanates are particularly preferred.

The organic isocyanates that are produced by the invention have wide utility. Many of the monoisocyanates are useful for producing carbamates having biological activity. The polyisocyanates are useful for producing urethane polymers such as foams, elastomers, fibers, coatings, and the like. All of the isocyanates are useful as reaction intermediates.

The examples below illustrate the invention.

EXAMPLES 1–5

A series of experiments were carried out in which tolylene diisocyanate (TDI) was recovered from phosgenation process distillation residues which contain polymeric materials, ortho-dichlorobenzene (DCB), and tolylene diisocyanate.

A semi-continuous, vacuum ball mill was constructed from a 2-liter stainless steel flask. The flash was mounted so that it was partially immersed in an oil bath, and it was equipped so that the distillation residue was introduced at one end and the tolylene diisocyanate vapor was withdrawn at the other end. The diisocyanate vapors were condensed and collected in a receiver. The vacuum was maintained in the flask via the duct through which the diisocyanate vapors were drawn. Means for preheating the distillation residue feed was also provided.

The table below displays the variables for 5 runs. Steel balls were employed that had diameters of ¾ inch. In all cases the vacuum employed was such that an absolute pressure of 20 millimeters of mercury was maintained in the flask. The table displays the oil bath temperature, pre-heater temperature, proportion of polymeric materials (solids) present in the residue feed, weight of residue feed, weight of solids recovered from the mill, weight and analysis of distillate, and the percent of tolylene diisocyanate recovered. This percentage is calculated from the weight of diisocyanate product collected compared with the amount of tolylene diisocyanate in the residue feed which is calculated by subtracting from the total weight of the feed the weight of the solid polymeric material in the feed plus other materials such as dichlorobenzene which are also in the feed. In all cases, the recovery of tolylene diisocyanate was greater than 100 percent of theory which indicates that some of the solid polymeric material breaks down to produce the diisocyanate.

TABLE

| Example | Residue feed | | Oil bath temp., °C. | Pre-heater temp., °C. | Vacuum ball mill operation | | | | | Analysis of distillate, percent | | | | |
|---|---|---|---|---|---|---|---|---|---|---|---|---|---|---|
| | Weight, grams | Wt. percent solids | | | R.p.m. of mill | No. balls in mill | Time, hrs. | Feed rate, grams/hr. | Weight of solids recovered, grams | Weight of distillation, grams | TDI | DCB | Entrained solids | Percent TDI recovered |
| 1 | 514 | 43 | 250 | 175 | 48–55 | 20 | 4 | 129 | 207 | 326 | 95.6 | 3.99 | 1.35 | 110 |
| 2 | 508 | 43 | 200 | 175 | 50–56 | 20 | 4 | 127 | 218 | 296 | 95.3 | 4.39 | 0.64 | 101 |
| 3 | 510 | 43 | 231 | 175 | 45–56 | 40 | 4 | 128 | 214 | 314 | 95.7 | 3.89 | 1.15 | 107 |
| 4 | 504 | 40.5 | 250 | | 49–55 | 40 | 4 | 126 | 148 | 345 | 99.9 | .049 | 2.68 | 112 |
| 5 | 1,126 | 43 | 300 | | 47–55 | 40 | 9 | 125 | 300 | 796 | 96.0 | 3.59 | 6.78 | 116 |

What is claimed is:

1. A method of recovering and separating tolylene diisocyanate product from a viscous distillation residue formed after distillation of tolylene diisocyanate produced by the phosgenation of tolylene diamine, said residue containing tolylene diisocyanate and polymeric material, comprising thermally cracking the polymeric material by heating said residue in a rotating ball mill evaporator at a temperature in excess of 100° C. and a pressure of from about 1 mm. of mercury to about 700 mm. of mercury and recovering by distillation tolylene diisocyanate initially present and tolylene diisocyanate produced by the thermal cracking.

2. A method as claimed in claim 1 wherein the temperature is from about 150° C. to about 250° C.

References Cited

UNITED STATES PATENTS

| 1,879,479 | 9/1932 | Punnett | 23—286 |
| 2,706,169 | 4/1955 | Beck | 260—453 XR |
| 3,140,305 | 7/1964 | Lowenstein | 260—453 |
| 3,180,852 | 4/1965 | Pfirschke et al. | 260—453 XR |
| 3,220,804 | 10/1965 | Bachmann et al. | 23—286 |

CHARLES B. PARKER, Primary Examiner

DOLPH H. TORRENCE, Assistant Examiner

U.S. Cl. X.R.

202—238; 203—28, 91; 260—2.5, 77.5, 471, 482, 999